(12) United States Patent
Batenburg et al.

(10) Patent No.: US 7,627,416 B2
(45) Date of Patent: Dec. 1, 2009

(54) METHOD AND APPARATUS FOR OPERATING A DUAL FUEL INTERNAL COMBUSTION ENGINE

(75) Inventors: Greg Batenburg, North Delta (CA); Jeff Thompson, Vancouver (CA); Douglas Chambers, Epson (GB)

(73) Assignee: Westport Power Inc., Vancounver, BC (CA)

( * ) Notice: Subject to any disclaimer, the term of this patent is extended or adjusted under 35 U.S.C. 154(b) by 0 days.

(21) Appl. No.: 12/208,020

(22) Filed: Sep. 10, 2008

(65) Prior Publication Data

US 2009/0070008 A1 Mar. 12, 2009

Related U.S. Application Data

(63) Continuation of application No. PCT/CA2007/000401, filed on Mar. 9, 2007.

(51) Int. Cl.
*F02D 19/08* (2006.01)
*F02D 41/30* (2006.01)

(52) U.S. Cl. .................... 701/103; 123/525
(58) Field of Classification Search ............. 701/102, 701/103, 104; 123/525, 526, 575, 577
See application file for complete search history.

(56) References Cited

U.S. PATENT DOCUMENTS

| | | | |
|---|---|---|---|
| 4,535,728 A | 8/1985 | Batchelor | |
| 4,742,801 A | 5/1988 | Kelgard | |
| 5,816,224 A | 10/1998 | Welsh et al. | |
| 6,101,986 A * | 8/2000 | Brown et al. | 123/525 |
| 7,019,626 B1 * | 3/2006 | Funk | 123/525 |
| 2007/0199539 A1 * | 8/2007 | Lennox et al. | 123/527 |
| 2008/0103676 A1 * | 5/2008 | Ancimer et al. | 701/103 |
| 2008/0262701 A1 * | 10/2008 | Williams et al. | 701/103 |

FOREIGN PATENT DOCUMENTS

CA 1186773 B1 5/1985

\* cited by examiner

*Primary Examiner*—Stephen K Cronin
*Assistant Examiner*—Arnold Castro
(74) *Attorney, Agent, or Firm*—McAndrews, Held & Malloy, Ltd.

(57) ABSTRACT

In an internal combustion engine that can burn two fuels, the main fuel may become unavailable, either temporarily or until the main fuel is replenished. The present apparatus determines when to fuel an engine with main fuel and secondary fuel, or secondary fuel alone. The apparatus includes a main-fuel supply system comprising a main-fuel injection valve that introduces main fuel into an engine combustion chamber; a secondary-fuel injection system comprising a secondary-fuel injection valve that introduces secondary fuel directly into the combustion chamber; a pressure sensor associated with the main-fuel supply system for determining injection pressure inside the main-fuel injection valve; and an electronic controller in communication with the pressure sensor and programmable to separately command actuation of the secondary-fuel and the main-fuel injection valve when injection pressure is greater than a predetermined threshold, and to otherwise command actuation of the secondary-fuel injection valve and not the main-fuel injection valve.

24 Claims, 5 Drawing Sheets

METHOD AND APPARATUS FOR OPERATING A DUAL FUEL INTERNAL COMBUSTION ENGINE

CROSS-REFERENCE TO RELATED APPLICATION(S)

This application is a continuation of International Application No. PCT/CA2007/000401, having an international filing date of Mar. 9, 2007, entitled "Method And Apparatus For Operating A Dual Fuel Internal Combustion Engine". The '401 international application claimed priority benefits, in turn, from Canadian Patent Application No. 2,538,980 filed Mar. 10, 2006. The '401 international application is hereby incorporated by reference herein in its entirety.

FIELD OF THE INVENTION

The present invention relates to a method and apparatus for operating a dual fuel internal combustion engine. More specifically, the invention relates to a method and apparatus for an electronic engine controller to automatically determine when to deliver two fuels or only one fuel to the engine's combustion chamber.

BACKGROUND OF THE INVENTION

Engines that burn diesel fuel are the most popular type of compression ignition engines. So-called diesel engines introduce fuel at high pressure directly into the combustion chamber. Diesel engines are very efficient because this allows high compression ratios to be employed without the danger of knocking, which is the premature detonation of the fuel mixture inside the combustion chamber. Because diesel engines introduce their fuel directly into the combustion chamber, the fuel injection pressure must be greater than the pressure inside the combustion chamber when the fuel is being introduced, and, for liquid fuels the pressure must be significantly higher so that the fuel is atomized for efficient combustion.

Diesel engines are favored by industry because they are proven performers that are known to give operators the best combination of power, performance, efficiency and reliability. For example, diesel engines are generally much less expensive to operate compared to gasoline fueled spark-ignited engines, especially in high-use applications where a lot of fuel is consumed. However, a disadvantage of diesel engines is that they can produce more pollution, such as particulate matter (soot) and NOx, which are subject to increasingly stringent regulations that require such emissions to be progressively reduced over time. To comply with such regulations, engine manufacturers are developing catalytic converters and other after treatment devices to remove pollutants from the exhaust stream. Improvements to the fuel are also being introduced, for example to reduce the amount of sulfur in the fuel, to prevent sulfur from de-activating catalysts and to reduce air pollution. Research is being conducted to improve combustion efficiency to reduce engine emissions, for example by making refinements to engine control strategies. However, most of these approaches add to the capital cost of the engine and/or the operating costs.

Recent developments have been directed to substituting some of the diesel fuel with cleaner burning gaseous fuels such as, for example, natural gas, pure methane, butane, propane, hydrogen, and blends thereof. However, in this disclosure "gaseous fuel" is defined more broadly than these examples. Gaseous fuel is defined herein as any combustible fuel that is in the gaseous phase at atmospheric pressure and ambient temperature. Since gaseous fuels typically do not auto-ignite at the same temperature and pressure as diesel fuel, a small amount of liquid fuel can be introduced into the combustion chamber to auto-ignite and trigger the ignition of the gaseous fuel. One approach for consuming gaseous fuel on board a vehicle involves introducing the gaseous fuel into the engine's intake air manifold at relatively low pressures. In this approach, since the gaseous fuel is inducted into the intake air stream, the supply pressure of gaseous fuel is not a limiting factor in determining when gaseous fuel can be introduced. The liquid fuel injection valve for introducing the diesel fuel into the combustion chamber can use the same orifice geometry as a conventional diesel valve, and engines with this design can operate with only diesel fuel if the gaseous fuel is not available. This can be an advantage if a vehicle powered by such an engine operates on a route where it can not replenish its supply of gaseous fuel, because if the vehicle runs out of gaseous fuel it can continue to operate using diesel fuel only. However, this feature can be viewed as a disadvantage by regulators and government agencies who offer subsidies for engines fuelled with cleaner burning gaseous fuels, because with this technology there is no easy way to ensure that an operator who applies for such a subsidy will actually fuel the subsidized engine with a gaseous fuel and engine emissions can be much higher when the engine is fuelled with only diesel fuel, compared to when the engine is fuelled with gaseous fuel and only pilot quantities of diesel fuel.

In addition, dual fuel engines that introduce fuel into the intake air manifold or intake port have been unable to match the performance and efficiency of conventional diesel engines. There are a number of factors that contribute to this shortcoming. Dual fuel engines that introduce the gaseous fuel into the intake air stream normally must be made with a lower compression ratio because the gaseous fuel can pre-mix with the air earlier in the compression stroke, introducing the potential for engine knock, which is the premature detonation of fuel in the combustion chamber. To prevent engine knock, such engines must either limit the amount of gaseous fuel that can be introduced into the combustion chamber, or reduce the engine's compression ratio. A lower compression ratio results in an engine that can not match the performance and efficiency of an engine that has the same compression ratio as a diesel engine. Another disadvantage of introducing the gaseous fuel into the intake air stream is that by occupying space in the intake air manifold, the fuel can reduce the mass of air that can flow into the combustion chamber.

In another approach to substituting gaseous fuel for most of the diesel fuel, it is possible to substantially match the performance and efficiency of a conventional diesel engine by injecting a high-pressure gaseous fuel directly into the combustion chamber. With this approach the timing for introducing the fuel into the combustion chamber can be controlled and the compression ratio can be kept the same as a conventional diesel engine. However, a problem with directly injecting both fuels into the combustion chamber is that both fuels need to be supplied at a pressure that is high enough to overcome the in-cylinder pressure, while also introducing a fuel spray that penetrates into the combustion chamber space to mix with the air. In the case of liquid fuels, the injection pressure should be high enough to atomize the fuel so that it can be efficiently combusted inside the combustion chamber. In the case of gaseous fuels, as disclosed in co-owned Canadian patent application 2,463,791, filed Apr. 7, 2004, it is desirable for the injection pressure of the gaseous fuel to be high enough to cause the gaseous fuel to expand into the combustion chamber space at supersonic velocities.

Because liquid fuels are substantially incompressible fluids, a liquid fuel pump can raise the liquid fuel pressure to the desired injection pressure almost instantly. However, because a gaseous fuel is a compressible fluid, there can be times during operation of the engine when it is not possible to supply the gaseous fuel at the desired injection pressure. For example, this can occur when the engine is starting up, or when the gaseous fuel tank is empty, or if there is a problem with the gaseous fuel pump or compressor. Without a control strategy for such occurrences, there can be times when the gaseous-fuel injection valve is operated with little or no gaseous fuel being introduced into the combustion chamber. In start-up conditions, when the gaseous-fuel supply system is being pressurized, opening the gaseous-fuel injection valve can slow the time it takes to raise gaseous fuel pressure to the normal operating level. Failing to recognize that gaseous-fuel is not being introduced into the combustion chamber with the desired injection pressure or in the desired amounts can result in poor combustion, higher particulate matter and unburned hydrocarbon exhaust emissions, and lower engine performance and efficiency, since injection timing may not be matched to the amount of fuel being introduced into the combustion chamber.

For some engines that use a gaseous fuel as the main fuel, the liquid fuel injection valves are not capable of introducing enough liquid fuel to operate the engine at full power using liquid fuel alone. For example, if the nozzle orifices are sized for delivering smaller quantities of liquid fuel with predetermined flow rates and velocities under normal operating conditions such orifices may be sized too small to introduce liquid fuel in quantities sufficient to operate the engine on only liquid fuel. For engines that are the prime mover for a vehicle, a control strategy is needed to handle the possibility of the vehicle running out of gaseous fuel and not being able to operate at full power.

Accordingly, for an engine that is incapable of operating at full power with liquid fuel only, there is a need for a control strategy that recognizes when gaseous fuel is not available, for controlling engine operation in such a situation, and for recognizing when gaseous fuel is available so the engine can resume normal operation.

SUMMARY OF THE INVENTION

An apparatus is provided for determining when to fuel an internal combustion engine with main fuel and secondary fuel or secondary fuel alone. The apparatus comprises
(a) a main-fuel supply system comprising a main-fuel injection valve that is operable to introduce the main fuel into a combustion chamber of the engine;
(b) a secondary-fuel injection system comprising a secondary-fuel injection valve that is operable to introduce the secondary fuel directly into the combustion chamber;
(c) a pressure sensor associated with the main-fuel supply system for determining an available injection pressure inside the main-fuel injection valve; and
(d) an electronic controller in communication with the pressure sensor and programmable to separately command actuation of the secondary-fuel injection valve and the main-fuel injection valve when the available injection pressure is greater than a predetermined threshold and to otherwise command actuation of the secondary-fuel injection valve and not the main-fuel injection valve.

In a preferred arrangement, the pressure sensor is installed on a main-fuel supply rail between a pressure control valve and the main-fuel injection valve. The engine can comprise a plurality of combustion chambers and the main-fuel injection valve can be one of a plurality of main-fuel injection valves with each one of the plurality of main-fuel injection valves associated with a respective one of the plurality of combustion chambers. In a multi-cylinder engine, each one of the plurality of main-fuel injection valves comprises a nozzle extending into the associated one of the combustion chambers such that the main fuel is injectable directly into each one of the associated combustion chambers. That is, in preferred embodiments, the main fuel and the secondary fuel are injected directly into the combustion chamber.

In preferred embodiments, the secondary-fuel injection valve and the main-fuel injection valve are independently operable and integrated in a combined dual fuel injection valve assembly with orifices for separately introducing the main fuel and the secondary fuel directly into the combustion chamber.

The apparatus preferably comprises an accumulator fluidly connected to a main-fuel supply pipe with a shut off valve between the accumulator and the main-fuel supply pipe. In a preferred arrangement, the accumulator can be in fluid communication with the main-fuel supply pipe at a point between a device for pressurizing the main fuel and a pressure regulating valve. The apparatus can further comprise a second accumulator vessel that is in fluid communication with the main-fuel supply pipe.

In preferred embodiments the main-fuel supply system comprises a device for pressurizing the main fuel and a main-fuel supply pipe for delivering the main fuel from the device to the main-fuel injection valve. In a preferred embodiment the main-fuel supply system is a common rail fuel supply system that delivers the main fuel at injection pressure to the fuel injection valves, with the fuel being injectable directly into the combustion chamber through the fuel injection valve. The device for pressurizing the main fuel can be a compressor, or a pump, if the main fuel is stored as a liquefied gas. If the main fuel is a liquefied gas, it can be stored in a thermally insulated storage tank adapted to store the main fuel at cryogenic temperatures.

In preferred embodiments the main fuel is a gaseous fuel and the secondary fuel is a liquid fuel. The main-fuel supply system can be adapted to supply a gaseous fuel selected from the group consisting of natural gas, methane, propane, butane, hydrogen, and blends thereof. The secondary-fuel supply system is adapted to supply a liquid fuel selected from the group consisting of diesel fuel, dimethyl ether, bio-diesel, and kerosene.

In a preferred apparatus, to reduce modifications to the cylinder head of conventional compression ignition engines that are fueled with a single fuel, the secondary-fuel injection valve and the main-fuel injection valve are integrated into a single assembly. The advantage of this arrangement is that a single integrated valve assembly can be installed in the same opening that is normally occupied by a single-fuel injection valve.

A method is provided for determining when to fuel an internal combustion engine with main fuel and secondary fuel or secondary fuel alone. The method comprises:
(a) measuring available injection pressure of the main fuel;
(b) operating in a dual fuel mode by fuelling the engine with the main fuel and the secondary fuel with commanded quantity and injection timing for each fuel determined based upon engine speed and engine load, when the available injection pressure is above a predetermined threshold pressure; and (c) operating in a secondary fuel mode by fuelling the engine with secondary fuel alone with commanded quantity and injection timing based upon engine speed and load.

The method can further comprise:

(d) switching between the dual fuel mode and the secondary fuel mode when the available injection pressure equals the predetermined threshold pressure, and then enabling a deadband which defines a predetermined pressure range that comprises the threshold pressure;

(e) preventing further switching between operating modes until the deadband is disabled;

(f) disabling the deadband and operating in the dual fuel mode when the available injection pressure is higher than the predetermined pressure range; and (g) disabling the deadband and operating in the secondary fuel mode when the available injection pressure is lower than the predetermined pressure range. In preferred embodiments, the predetermined pressure range has boundaries higher and lower than the threshold pressure.

Preferred methods further comprise limiting operation in the secondary fuel mode to a predetermined time, providing a warning to an engine operator that the engine will shut down if the predetermined time expires, and shutting down the engine when the predetermined time expires. For example, the predetermined time can be 10 minutes or less than 15 minutes.

The method can further comprise pressurizing an accumulator vessel for the main fuel before shutting down the engine. To preserve a store of high pressure gaseous fuel inside the accumulator, the method preferably comprises closing a shut off valve between the accumulator vessel and a main fuel supply pipe before shutting down the engine. In one embodiment, the method can further comprise opening the shut off valve for a predetermined time when the engine is starting up until available injection pressure equalizes with pressure inside the accumulator, and then closing the shut off valve until the available injection pressure is raised to a high set point. The method can also further comprise pressurizing a large accumulator vessel and a small accumulator vessel, wherein both accumulator vessels are in fluid communication with a main-fuel supply pipe that delivers main fuel to the main-fuel injection valve. For example, in some systems the small accumulator can be employed to reduce the time needed to pressurize the main-fuel rail if the large accumulator is empty when the engine is starting up.

BRIEF DESCRIPTION OF THE DRAWINGS

FIG. 1 shows a basic control strategy that shows the main operating principle whereas FIGS. 1A and 1B show a more preferred strategies that introduce a deadband to prevent oscillations between the selected operating modes.

DETAILED DESCRIPTION OF PREFERRED EMBODIMENT(S)

Figure 1:
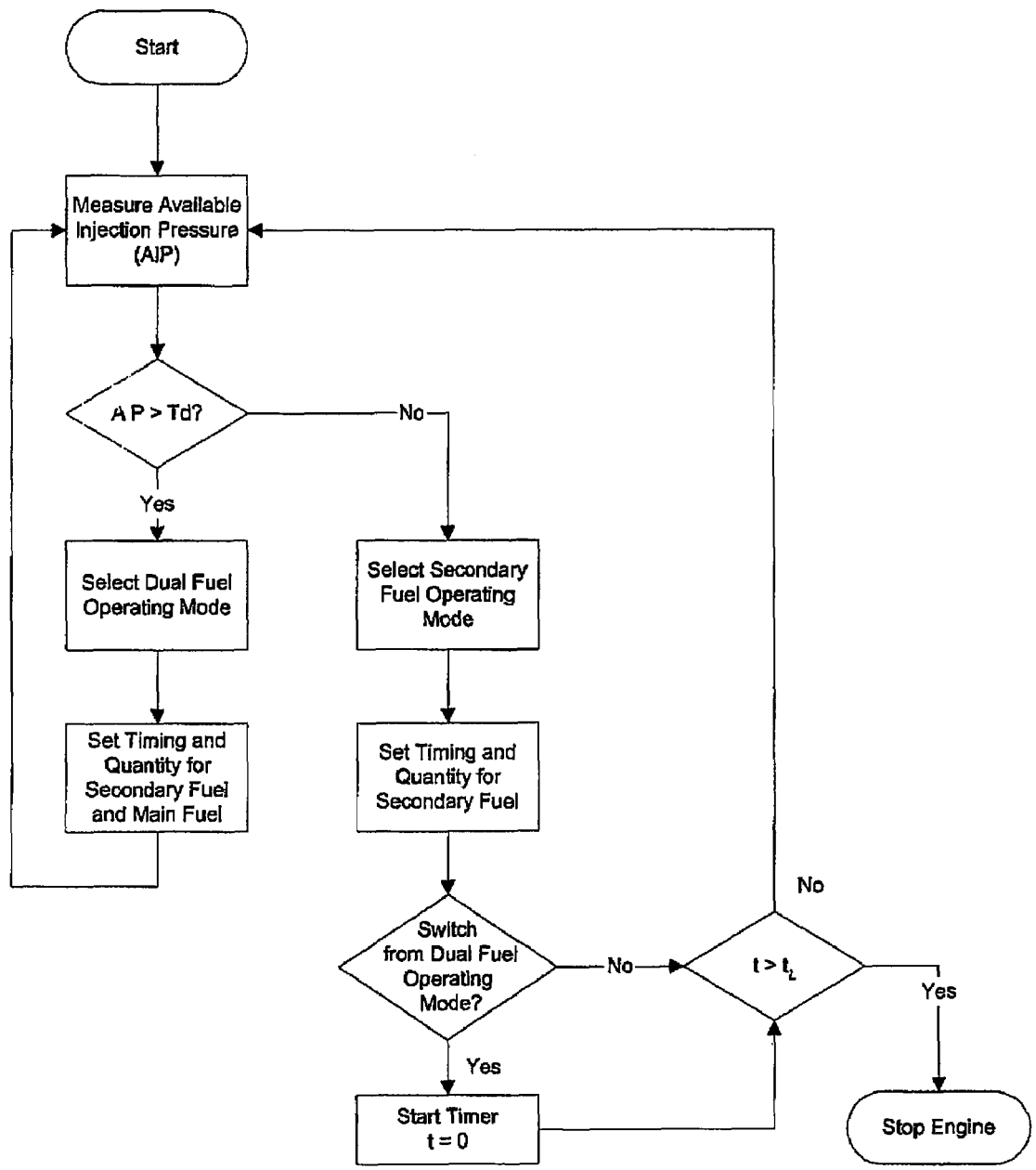
FIGS. 1, 1A and 1B are flow diagrams that illustrate control strategies for determining whether to fuel an engine with a main fuel and a secondary fuel or the secondary fuel alone.

The present method is directed to internal combustion engines that are fuelled with a main fuel and a secondary fuel wherein the two fuels can be independently and separately introduced directly into the engine's combustion chamber. In some embodiments, the secondary fuel injection valve is adapted to introduce smaller quantities of fuel on an energy basis. For such engines, a control strategy is needed to handle the situation when the main fuel is unavailable. This is especially true for engines that have secondary-fuel injection valves with a geometry that restricts secondary fuel mass flow rate to the extent that the engine is unable to operate at full power with secondary fuel alone.

In this disclosure, "secondary fuel" is a term that is used to describe a second fuel that is normally more auto-ignitable than the main fuel. Under normal operation, only a small quantity of secondary fuel is injected into the combustion chamber to assist with ignition of the main fuel. That is, under normal operating conditions, the secondary fuel serves as a pilot fuel for assisting with ignition of the main fuel, and, on average can represent less than ten percent of the total fuel consumed on an energy basis. For example, the secondary fuel can be selected from the group consisting of diesel fuel, kerosene, bio-diesel, and dimethylether. However, in this disclosure, unlike a pilot fuel, the secondary fuel is not restricted to describing a fuel that is only employed to act as a pilot for igniting another fuel. The described control strategy allows the engine to be fuelled with secondary fuel alone when the main fuel is not available; in such conditions the secondary fuel acts not as a pilot for igniting another fuel, but is itself the only fuel that is consumed by the engine. When the engine is fuelled with secondary fuel alone, in preferred embodiments the engine's power output is reduced and the time that the engine can be operated fuelled with secondary fuel alone can be restricted.

In preferred embodiments the main fuel is a gaseous fuel that is cleaner burning than conventional liquid fuels such as diesel. For example, the main fuel can be natural gas, pure methane, butane, propane, hydrogen, and blends thereof. In preferred embodiments the main fuel is a clean-burning gaseous fuel, so in the description of preferred embodiments, "gaseous fuel" is used interchangeably with "main fuel", but persons familiar with engine technology will understand that the main fuel could also be a liquid fuel that requires a secondary fuel different from the main fuel to trigger ignition. Because the gaseous fuel, on average, represents at least 90 percent of the fuel consumed on an energy basis, compared to a conventional diesel-fuelled engine, emissions of NOx and particulate matter are much reduced since most of the fuel consumed by the engine is a fuel that is cleaner burning than the liquid fuel that it replaces.

With conventional engines, liquid fuels are incompressible fluids so as long as there is fuel available, a liquid fuel can be quickly pumped to the desired injection pressure. This is not the case for gaseous fuels. Because gaseous fuels are compressible and the fluid flow characteristics are different, situations can arise in which the gaseous fuel is not available at the desired injection pressure as quickly, either temporarily, or until the gaseous fuel can be replenished. For example, when the fuel tank that stores the gaseous fuel is empty, gaseous fuel is not available. If one of the components in the fuel system fails or is working at reduced capacity, gaseous fuel may not be available at the desired pressure until appropriate repairs are made and/or maintenance is done to the fuel system. At start up, even though gaseous fuel is available, if an accumulator vessel is not employed or if the accumulator is not filled with pressurized gaseous fuel, pressure in the gaseous fuel supply system can be temporarily low until the gaseous fuel pump or compressor is able to charge the system to normal operating pressure. In other circumstances, the engine controller can determine from on-board diagnostics that gaseous fuel should not be supplied to the engine, for example if the diagnostics indicate that there may be a leak in the gaseous fuel supply system or that there is a problem with the gaseous fuel injection valves.

FIG. 1 is a flow diagram that shows the basic operating principle of the disclosed control strategy. The first step is to measure the available injection pressure (AIP). This is the pressure of the gaseous fuel inside the main-fuel injection valve, but the actual pressure measurement can be taken in a main-fuel supply pipe or a main-fuel rail that delivers the gaseous fuel to the main-fuel injection valves. If the available injection pressure is greater than a predetermined threshold pressure (Td) then the controller selects the dual fuel operating mode and sets the timing and quantity for the injection of main fuel and secondary fuel into the combustion chamber. For example, in a preferred embodiment, the threshold pressure can be about 18 MPA (about 2,600 psi). If the available injection pressure is not greater than the predetermined threshold pressure, then the controller selects the secondary fuel operating mode and sets the timing and quantity for the injection of secondary fuel only. The injection timing and pulse width for the secondary fuel can change when the controller switches from selecting the secondary fuel operating mode to the dual fuel operating mode, and vice versa, since in the later operating mode the secondary fuel is utilized as a pilot fuel and not as the main fuel. For example when the secondary operating mode is selected, the pulse width for injecting the secondary fuel can be longer and the timing for beginning the injection of the secondary fuel can be earlier in the compression stroke compared to the timing for the beginning of the injection of the main fuel when the dual fuel operating mode is selected. For example, in the secondary fuel operating mode, the timing for injection of the secondary fuel can be between 10 and 20 crank angle degrees earlier than the timing for main fuel injection in the dual fuel operating mode. The actual timing and pulse width is dependent upon the characteristics of a given engine.

When the secondary fuel operating mode is selected, a timer is preferably used to limit the time that the engine can operate in this operating mode. In preferred embodiments, the secondary fuel operating mode is useful for start up conditions or emergency situations where the main fuel is not available either temporarily or until the supply of gaseous fuel can be replenished or until the main fuel supply system can be serviced. At start up, the engine can be started in the secondary fuel operating mode and run in an idle mode until the available injection pressure for the main fuel is increased to the desired operating range. In an emergency situation, the timer can allow the engine to operate for long enough to allow a vehicle to be driven to a safe place to stop, or if full power output is not needed, the vehicle can be driven to a nearby refueling station. For example, the timer can be set to allow enough time for a vehicle to driven in the secondary fuel operating mode to a fueling depot in a fleet operator's yard. However, in preferred embodiments, because the engine can not deliver full power to a vehicle in the secondary fuel operating mode, an engine of this type can not circumvent dual fuel operation for normal vehicle use, and this can make the disclosed engine eligible for clean-fuel subsidies that may not be available to other dual fuel engines that permit the engine to deliver full power when fueled with secondary fuel alone. In FIG. 1, the timer feature is initiated by determining if there was a switch from the dual fuel operating mode to the secondary fuel operating mode. The timer can be a simple chronometer that starts from t=0 each time the controller switches from the dual fuel operating mode to the secondary fuel operating mode. For as long as the engine operates in the secondary fuel operating mode, in each control loop the controller determines if the timer has exceeded a predetermined time limit $t_L$, and when the time in the secondary fuel operating mode exceeds $t_L$, then the controller stops the engine. To some extent, predetermined time limit $t_L$ can be arbitrarily set because there is already a disincentive to operate in the secondary fuel operating mode since the engine can not achieve full power output in this mode.

Depending upon the design of the fuel supply and injection system, there may be other operational considerations that discourage prolonged operation in the secondary fuel operating mode. For example, in some embodiments, $t^{\wedge}$ can be set to be around 10 minutes, or more preferably an even shorter time.

Figure 1A:
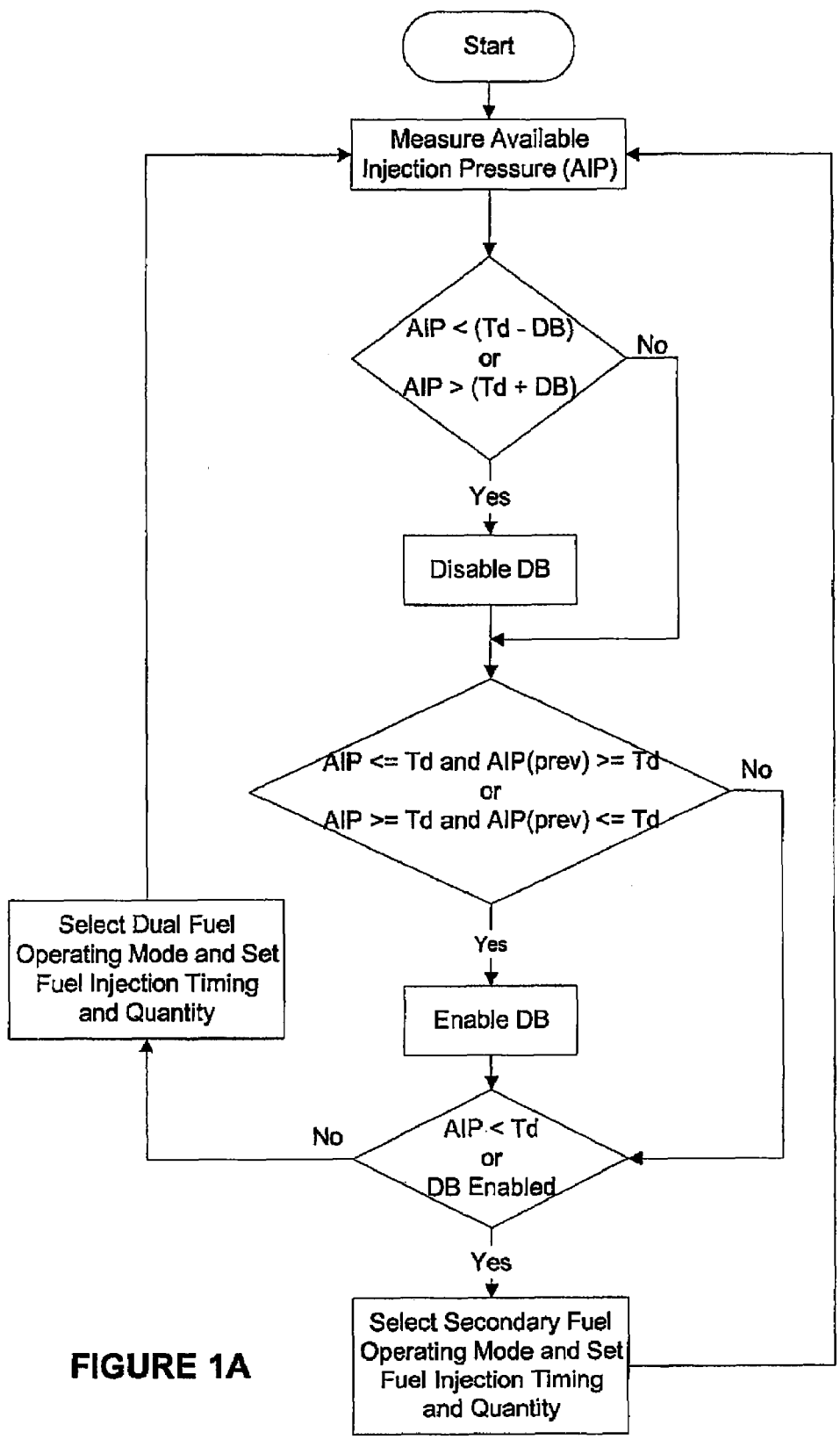

FIG. 1A is a preferred control strategy because it introduces a deadband that reduces oscillations between operating modes. For simplicity FIG. 1A does not show the timer feature but this feature can be incorporated into all preferred embodiments. The deadband is a predetermined pressure range that in preferred embodiments can be added or subtracted from the predetermined threshold pressure to define upper and lower pressure limits that are used by the control method in the manner described herein. The method begins by measuring the available injection pressure (AIP). The first question considered by the controller is to determine if the available injection pressure is less than the lower pressure limit or greater than the upper pressure limit as defined by the deadband. If the answer to one of these conditions is "yes" then the available injection pressure is outside of the range defined by the lower and upper pressure limits, and the electronic controller disables the deadband. If the available injection pressure is between the lower and upper pressure limits, and the deadband has been previously enabled, then the deadband remains enabled. The second question considered by the electronic controller is whether the available injection pressure has risen above or dropped below the predetermined threshold pressure since the previous control loop. The disclosed method answers this question by determining if one of two criteria is satisfied. The first criteria is whether the available injection pressure is less than or equal to the predetermined threshold pressure and the available injection pressure measured in the previous control loop was greater than or equal to the predetermined threshold pressure. The second criteria is whether the available injection pressure is greater than or equal to the predetermined threshold pressure and the available injection pressure measured in the previous control loop was less than or equal to the predetermined threshold pressure. If one of these criteria is met, this means that the predetermined threshold pressure was equaled or crossed since the previous control loop, and the deadband is enabled. If one of these criteria is not met then no change is made to the status of the deadband before proceeding to the third question, which is whether the available injection pressure is less than the predetermined threshold pressure or whether the deadband is enabled; if one of these is true, then the electronic controller selects the secondary fuel operating mode and sets the fuel injection timing and quantity in accordance with this operating mode. If available injection pressure is not less than the predetermined threshold pressure and the deadband is disabled, then the electronic controller selects the dual fuel operating mode and sets the fuel injection timing and quantity in accordance with this operating mode.

In applying the control strategy set out in FIG. 1A, the deadband reduces switching back and forth between the dual fuel and secondary fuel operating modes by maintaining the secondary fuel operating mode as long as the deadband is enabled, and by switching to the dual fuel operating mode from the secondary fuel operating mode only when the available injection pressure rises above the upper pressure limit (Td+DB). Once disabled, the deadband is not enabled until the available injection pressure crosses or equals the predetermined threshold pressure.

Figure 1B:
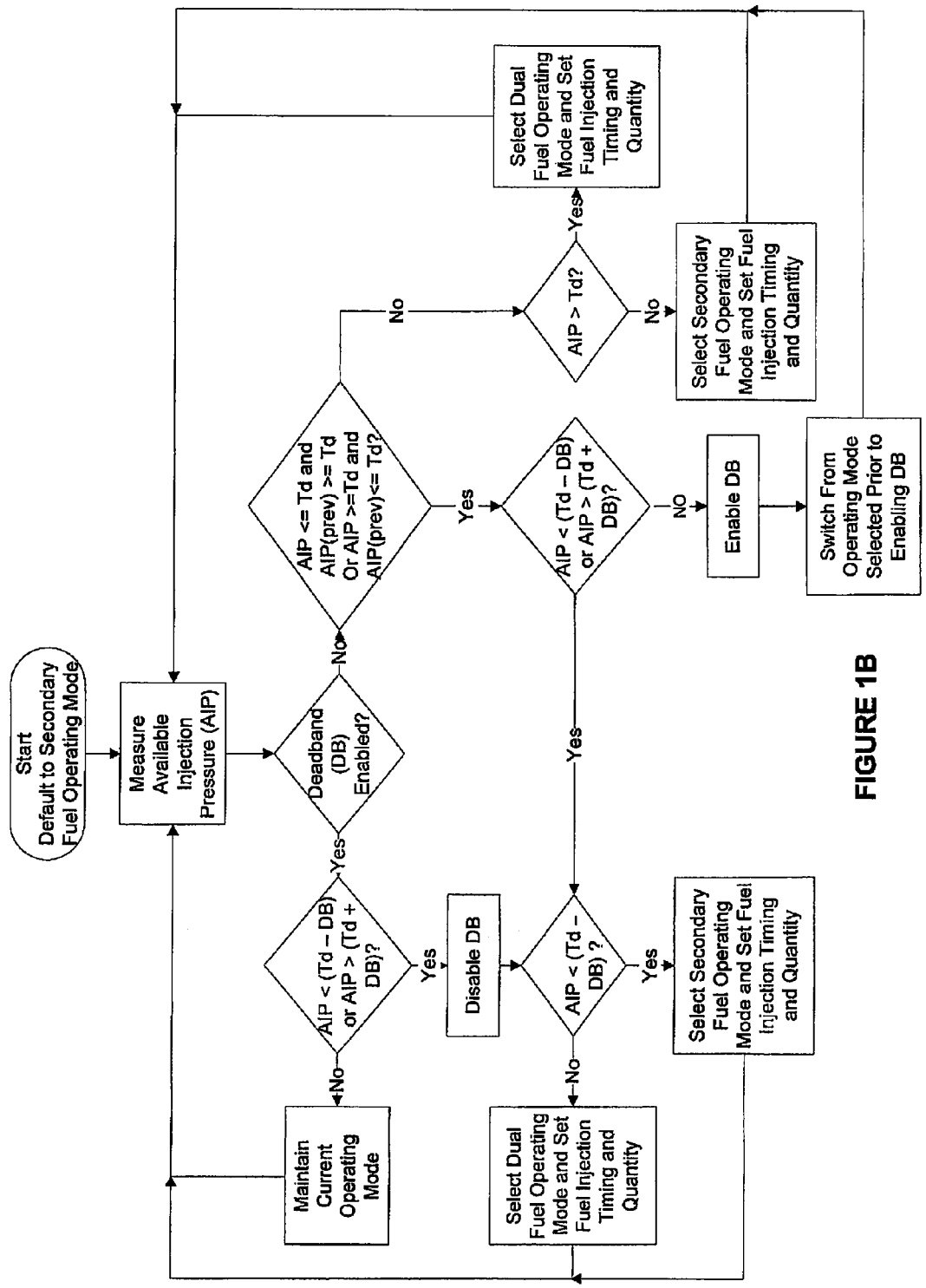

FIG. 1B illustrates another control method that also uses a deadband with similar results to the control method of FIG. 1A. In the method of FIG. 1B the deadband is enabled when the available injection pressures equals or crosses the predetermined threshold pressure. When the deadband is enabled, the electronic controller switches from the operating mode selected in the previous control loop to the other operating mode. The electronic controller disables the deadband and selects the dual fuel operating mode when the measured available injection pressure is greater than the upper pressure limit defined by the predetermined threshold pressure plus the deadband. When the measured available injection pressure is less than the lower pressure limit defined by the predetermined threshold pressure minus the deadband, the electronic controller disables the deadband and selects the secondary fuel operating mode.

With reference to FIG. 1B, after measuring the available injection pressure, the first question considered by the electronic controller is whether the deadband is enabled. If the deadband is enabled, the controller determines if the available injection pressure is still between the upper and lower pressure limits set by the deadbands. If the available injection pressure remains between the upper and lower pressure limits defined by the deadband, then the electronic controller maintains the currently selected operating mode. On the other hand, if the available injection pressure is below the lower pressure limit or above the upper pressure limit, then the electronic controller disables the deadband, while selecting the secondary fuel operating mode if the available injection pressure is less than the lower pressure limit, and otherwise selecting the dual fuel operating mode.

If the controller determines at the first question in the control loop that the deadband is not enabled, the electronic controller considers the measured available injection pressure and the available injection pressure that was measured in the previous control loop to determine if available injection pressure has equaled or crossed the predetermined threshold pressure since the previous control loop. If the available injection pressure has not crossed or equaled the predetermined threshold pressure since the previous control loop, then the deadband remains disabled and if available injection pressure is greater than the predetermined threshold pressure, then the electronic controller selects the dual fuel operating mode, with the secondary fuel operating mode being selected if the available injection pressure is not greater than the predetermined threshold pressure. If the electronic controller determines that the available injection pressure has crossed or equaled the predetermined threshold pressure since the previous control loop, and the measured available injection pressure remains between the upper and lower pressure limits defined by the deadband, then the deadband is enabled and the electronic controller commands a switch from the operating mode selected in the previous control loop to the other operating mode. If the available injection pressure has crossed or equaled the predetermined threshold pressure since the previous control loop, but the presently measured available injection pressure is not between the lower and upper pressure limits defined by the deadband, then the deadband remains disabled and the electronic controller selects the secondary fuel operating mode if the available injection pressure is less than the lower pressure limit, and otherwise selects the dual fuel operating mode.

With the control method of FIG. 1A, the electronic controller selects the secondary fuel operating mode when the deadband is enabled, whereas with the control method of FIG. 1B, the electronic controller switches operating modes when the deadband switches from being disabled to enabled. Both control methods impose a deadband to reduce switching back and forth between two operating modes in situations when the available injection pressure fluctuates around a predetermined threshold pressure between upper and lower pressure limits defined by the predetermined deadband.

Figure 2:
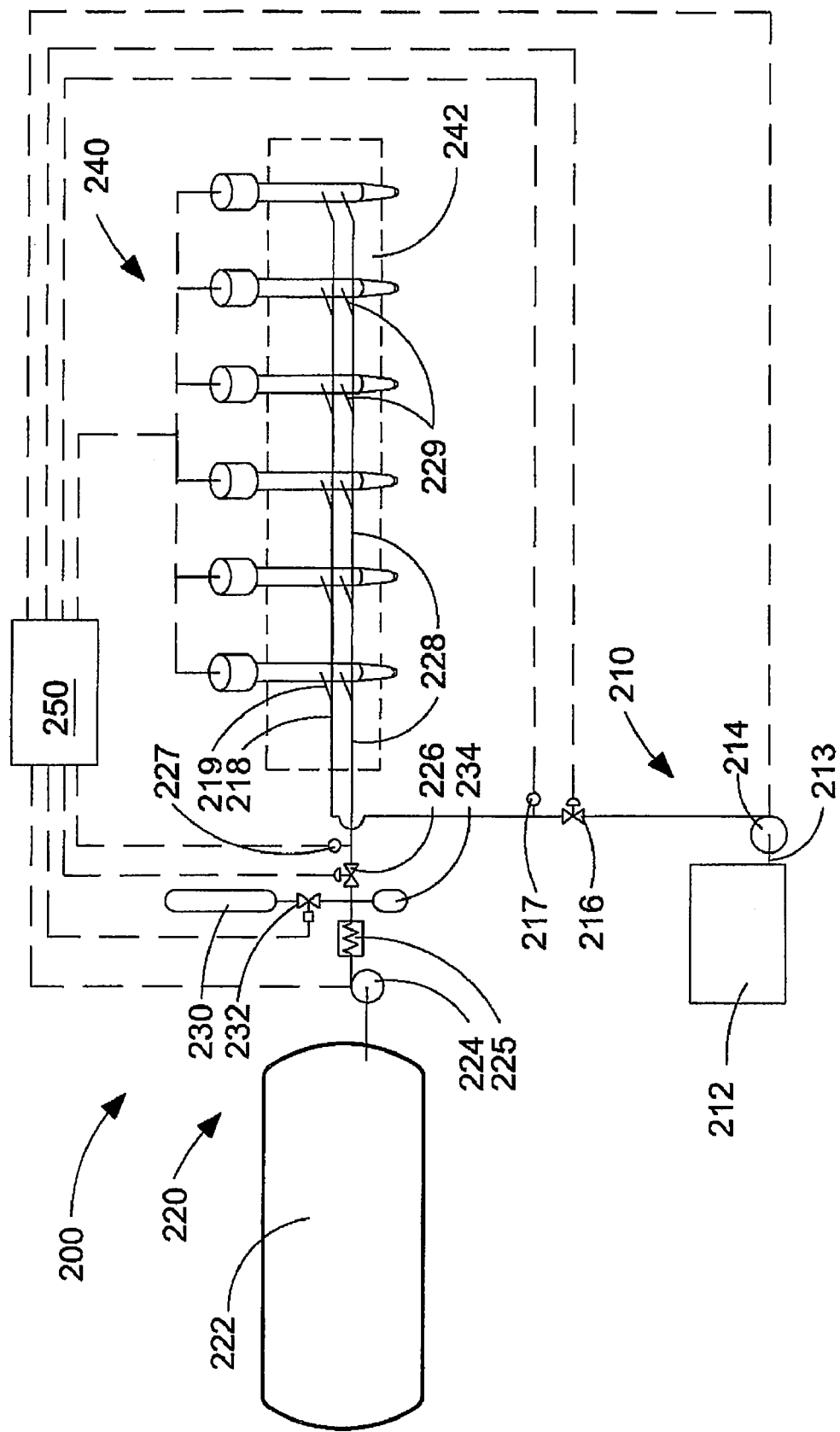
FIG. 2 is a schematic view of a fuel supply system for an engine that can be fuelled with a main gaseous fuel and a secondary liquid fuel.

FIG. 2 is a schematic view of apparatus 200, which delivers a main fuel and a secondary fuel into a combustion chamber of an internal combustion engine. In this example the secondary fuel is a liquid fuel and the main fuel is a gaseous fuel. Apparatus 200 comprises secondary-fuel supply system 210, which itself comprises secondary-fuel storage vessel 212, suction line 213, secondary-fuel pump 214, pressure control valve 216, optional pressure sensor 217, and secondary-fuel rail 218. Apparatus 200 further comprises main-fuel supply system 220, which itself comprises main-fuel storage vessel 222, main-fuel compressor 224, heat exchanger 225, pressure control valve 226, pressure sensor 227, and main-fuel rail 228.

The engine comprises a plurality of fuel injection valves 240, which are mounted in cylinder head 242. In FIG. 2, cylinder head 242 is schematically shown in dashed outline. In the illustrated embodiment the engine can have a cylinder block with six in-line cylinders (not shown), with one fuel injection valve associated with the combustion chamber defined by each cylinder. In the illustrated embodiments, each fuel injection valve 240 is capable injecting the secondary fuel and the main fuel into a respective combustion chamber (not shown), so each fuel injection valve 240 is associated with secondary-fuel rail 218 and main-fuel rail 228. Even though the secondary-fuel injection valve and the main-fuel injection valve are integrated into a single dual fuel injection valve, the secondary-fuel injection valve and the main-fuel injection valve are preferably independently operable to separately introduce the secondary fuel and main fuel into the combustion chambers. This allows separate timing for the secondary fuel and main fuel injection events and more precise control over the quantity of each fuel that is injected into the combustion chambers.

Persons familiar with the technology involved here will understand that the disclosed apparatus and method can be applied to internal combustion engines of different sizes and with any number of cylinders. For engines with more than one cylinder head, fuel supply rails can have branches associated with each cylinder head.

In another embodiment, not shown, the secondary-fuel injection valve can be separate from the main-fuel injection valve. The main fuel injection valve can introduce the main fuel into the intake air manifold or the intake ports immediately upstream from the combustion chambers. However, such an embodiment is less preferred since it is preferable to inject the main fuel directly into the combustion chamber to more closely emulate the power, performance and efficiency of a diesel engine, which injects fuel directly into the combustion chamber.

The method of operating apparatus 200 according to the control strategy shown in FIG. 1 is described as follows. Fuel injection valves 240 are preferably so-called common rail injection valves as shown in FIG. 2. That is, the fuel is supplied at injection pressure to each one of fuel injection valves 240 through the same fuel rail. People familiar with common rail technology will understand that the term "rail" as it is defined herein means a conduit, bore, or pipe that functions as a manifold for distributing fuel to the fuel injection valves. Accordingly, when the engine is running normally, secondary-fuel rail 218 and main-fuel rail 228 are each filled with a pressurized fuel at injection pressure, and fuel can be injected by actuating a respective valve needle from a closed position to an open position. With respect to the main fuel, the pressure that is measured by pressure sensor 227 is representative of the available injection pressure. Likewise, the pressure measured by pressure sensor 217 is representative of the available injection pressure for the secondary fuel.

The disclosed method is not dependent upon the type of fuel injector that is employed. For example, while a common rail fuel system is shown in FIG. 2, the method can be applied to an engine that uses unit injectors, each with an intensifier mechanism for raising the fuel pressure to injection pressure.

Controller 250 is programmable to maintain secondary fuel in secondary-fuel rail 218 at the desired injection pressure by operating pump 214 and by operation of pressure control valve 216, which is disposed in the secondary-fuel delivery pipe between pump 214 and secondary-fuel rail 218. Pressure control valve 216 can be operated to control secondary-fuel pressure in secondary-fuel rail 218 so that it is maintained at a predetermined fixed pressure when the engine is running. In other embodiments, pressure control valve 216 can be controlled by an electronic controller to regulate secondary-fuel pressure within secondary-fuel rail 218 responsive to engine operating conditions, for example to adjust pressure within secondary-fuel rail 218 to predetermined pressures defined by an engine map.

In the schematic illustration of FIG. 2, the secondary-fuel rail is shown having a plurality of branches 219 with branches 219 connecting secondary-fuel rail 218 to each one of fuel injection valves 240. Branches 219, which are shown schematically in FIG. 2, can be a bore in cylinder head 242 or if liquid-fuel rail 218 is a pipe, branches 219 can be pipes that connect to fuel injection valves 240 above cylinder head 242 or through an opening provided in cylinder head 242.

Controller 250 is programmable to maintain main fuel in main-fuel rail 228 at the desired injection pressure by operating compressor 224 and by operation of pressure control valve 226, which is located in the main-fuel delivery pipe between heat exchanger 225 and main-fuel rail 228. In preferred embodiments the main fuel is a gaseous fuel that can be stored as a compressed gas at high storage pressures to increase storage density. In some embodiments main-fuel storage vessel 222 can be a pressure-rated vessel for safely holding the main fuel at pressures up to 69 MPa (about 10,000 psia). For even greater storage density, a gaseous main fuel can be stored in liquefied form at cryogenic temperatures inside a double-walled vacuum insulated vessel.

Heat exchanger 225 can be employed to cool the main fuel after it has been compressed. Main-fuel compressor 224 is shown schematically in FIG. 2, but in a preferred embodiment compressor 224 can be one or a plurality of reciprocating piston compressors.

Main-fuel supply system 220 can further comprise accumulator vessel 230 upstream of pressure regulator 226. If the volume defined by the main-fuel supply pipe and main-fuel rail 228 is small, accumulator vessel 230 can be employed to facilitate maintaining the desired main-fuel pressure by ensuring that an adequate supply of high-pressure main fuel is available. When the engine is shut down, main-fuel rail 228 is normally vented or drained. Valve 232 can be closed when the engine is shut down to reserve some high pressure fuel for when the engine is started up. Upon starting up the engine, valve 232 can be opened to fill main-fuel rail 228 with main fuel. In preferred embodiments, the volume of accumulator 230 is much greater than the volume of main-fuel rail 228 so that there is normally ample fuel stored at high pressure in accumulator 230 to fill main-fuel rail 228. However, for systems with a lower ratio between the accumulator volume and the fuel rail volume, or if accumulator 230 is not fully charged when engine is starting up, after valve 232 is opened there may not be sufficient fuel to pressurize the main-fuel rail 228 above a predetermined low pressure set point, which means that compressor 224 is immediately commanded to supply more fuel gas to the fuel supply system. In this situation, if valve 232 is left open, it can take longer to fully pressurize main-fuel rail 228 because compressor 224 is filling main-fuel rail 228 and accumulator 230 at the same time and to further raise the pressure in main-fuel rail 228 compressor 224 would need to also raise the pressure in accumulator vessel 230. For systems in which the above-described situation can arise, the following procedure can be followed: upon starting the engine, valve 232 is initially opened to fill main-fuel rail 228 with fuel; meanwhile, pressure regulator 226 is wide open since main fuel pressure is normally initially at atmospheric pressure when the engine is starting up; after a predetermined delay to allow the initial filling of main-fuel rail 228, valve 232 is closed until the pressure measured by pressure sensor 227 reaches the high set point; and then valve 232 is opened so that compressor 224 can fill accumulator 230.

Accumulator 234 is an optional feature that can be employed in an engine system that requires accumulator 230 to have a large volume for normal operation but that can use smaller accumulator 234 to speed up initial pressurization of the fuel system by closing valve 232 and using only small accumulator 234. Once the engine is running in the dual fuel operating mode and the available injection pressure is above the predetermined threshold pressure, valve 232 can be opened and accumulator 230 can be filled.

When the secondary-fuel injection valve and the main-fuel injection valve are integrated into a dual fuel injection valve assembly, to reduce pressure differentials between the two high-pressure fuels, main-fuel injection pressure is preferably set to be equal or slightly less than the secondary-fuel injection pressure, so that main fuel, which in preferred embodiments is the gaseous fuel, does not leak into the secondary-fuel passages. An apparatus and method of dynamically controlling secondary-fuel and main-fuel pressures in an integrated secondary-fuel and main-fuel injection valve is disclosed in co-owned U.S. Pat. No. 6,298,833. Accordingly, the operation of pressure control valve 226 is preferably linked to the operation of pressure control valve 216, or one pressure control valve can be employed to maintain a pressure differential between the pressure in secondary-fuel rail 218 and the pressure in main-fuel rail 228.

Like secondary-fuel rail 218, in the schematic illustration of FIG. 1, main-fuel rail 228 is shown having branches 229 that connect gaseous-fuel rail 228 to respective ones of fuel injection valves 240.

Controller 250 is an electronic controller that can receive data indicative of engine operating parameters such as engine speed, available injection pressure, and operator inputs such as demanded load. Dashed lines leading from pressure sensors 217 and 227 to controller 250 indicate connections for sending data signals from the pressure sensors to controller 250. Controller 250 can process the data to determine signal commands by calculation and/or by reference to look up tables. Controller 250 sends signal commands to system components such as pressure control valve 226 or compressor 224 or fuel injection valves 240 as indicated by dashed lines leading from controller 250 to respective components. According to the presently disclosed method, controller 250 can determine available injection pressure in main-fuel rail 228, and whether the available injection pressure is sufficient, by being greater than a predetermined threshold pressure, to permit the engine to be operated in a dual fuel mode, or if not, to fuel the engine with only the secondary fuel. In FIG. 2, controller 250 is represented schematically as a single component but persons knowledgeable about engine control systems will understand that controller 250 can actually comprise several subcomponents that communicate using a controller area network. For example there can be a primary engine controller with a separate injector driver module, and a separate fuel supply system controller.

Controller 250 can be programmed to follow the methods shown in FIGS. 1, 1A and 1B. For example, as shown by FIGS. 1A and 1B, controller 250 can be programmed to enable a deadband if the available injection pressure equals a predetermined threshold pressure since the last engine cycle or injection event. Controller 250 is also programmable to include a timer for limiting the maximum time that the engine can be run continuously in the secondary fuel operating mode.

Figure 3:
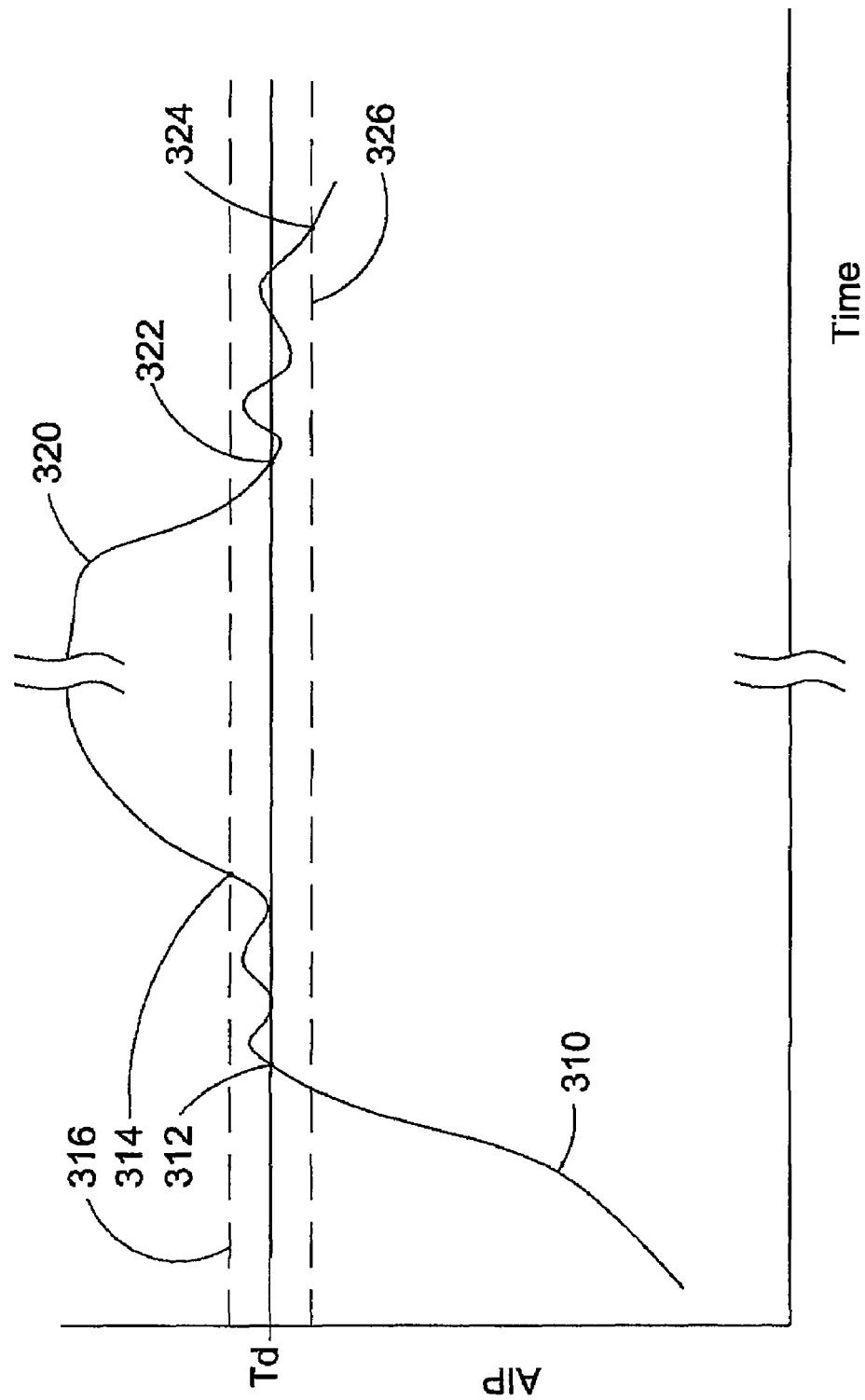
FIG. 3 is a graph that plots main fuel pressure against time, showing on the left side of the graph how the control strategy works when the main fuel pressure is rising from below a predetermined threshold to a normal operating pressure above the predetermined threshold. The right hand side of this graph shows how the control strategy works when the main fuel pressure is declining from above the predetermined threshold to a lower value.

The method of FIG. 1B is further illustrated by FIG. 3, which is a plot of available injection pressure (AIP) against time. When the engine is shut down, the main-fuel supply rail can be vented to atmospheric pressure, making it necessary to re-pressurize the main-fuel supply rail upon start up. Line 310 on the left hand side of FIG. 3 shows an example of how the available injection pressure can increase while the system is being pressurized. Initially, the deadband is disabled and since the available injection pressure is less than the predetermined threshold pressure Td, the controller selects the secondary fuel operating mode and sends the appropriate signal commands the engine components. For example, the controller sends signal commands to control the secondary fuel injection pressure and to command an appropriate timing and pulse width for each fuel injection event based upon the selected secondary fuel operating mode. At point 312, the available injection pressure equals the predetermined threshold pressure so controller selects and switches to the dual fuel operating mode, and also enables the deadband. The controller sends appropriate signal commands to the engine components to operate in the dual fuel mode as long as the available injection pressure remains between the deadband upper limit 316 and the deadband lower limit 326. In the illustrated example, at point 314 the available injection pressure equals the deadband upper limit 316, and when this happens the deadband is disabled and the controller continues to select the dual fuel operating mode since the available injection pressure is greater than the predetermined threshold pressure. Conversely, if line 310 did not equal deadband upper limit 316, and instead line 310 dropped to the deadband lower limit 326, the controller would still disable the deadband but would then switch back to the secondary fuel operating mode, since the available injection pressure would then be less than the predetermined threshold pressure.

As shown by line 310, when the available injection pressure is increasing, the plot of available injection pressure can oscillate and even dip below the predetermined threshold pressure, but the controller does not switch the selected operating mode or disable the deadband until line 310 crosses one of deadband boundaries. This reduces switching back and forth between the dual fuel operating mode and the secondary fuel operating mode, thereby reducing unstable operating conditions which can occur if a deadband is not employed.

On the right side of FIG. 3, line 320 plots a decline in the available injection pressure. In this example, because the available injection pressure is initially higher than the predetermined threshold pressure, the controller has initially selected the dual fuel operating mode and the deadband is disabled. When the available injection pressure equals the predetermined threshold pressure at point 322, the deadband is enabled and the controller selects the secondary fuel operating mode, maintaining this operating mode until line 320 crosses one of the deadband boundaries. At point 324 line 320 crosses the deadband lower limit 326, and at that time the controller disables the deadband and since the available injection pressure is less than the predetermined threshold pressure, the controller continues to select the secondary fuel operating mode.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus is provided for determining when to fuel an internal combustion engine with main fuel and secondary fuel or secondary fuel alone, said apparatus comprising:
   (a) a main-fuel supply system comprising a main-fuel injection valve that is operable to introduce said main fuel into a combustion chamber of said engine;
   (b) a secondary-fuel injection system comprising a secondary-fuel injection valve that is operable to introduce said secondary fuel directly into said combustion chamber;
   (c) a pressure sensor associated with said main-fuel supply system for determining an available injection pressure inside said main-fuel injection valve; and
   (d) an electronic controller in communication with said pressure sensor and programmable to separately command actuation of said secondary-fuel injection valve and said main-fuel injection valve to permit said engine to operate at power levels up to full power when said available injection pressure is greater than a predetermined threshold and to otherwise command actuation of said secondary-fuel injection valve and not said main-fuel injection valve to permit said engine to operate at reduced power levels less than full power for up to a predetermined amount of time.

2. The apparatus of claim 1 wherein said pressure sensor is installed on a main-fuel supply rail between a pressure control valve and said main-fuel injection valve.

3. The apparatus of claim 1 wherein said engine comprises a plurality of combustion chambers and said main-fuel injection valve is one of a plurality of main-fuel injection valves with each one of said plurality of main-fuel injection valves associated with a respective one of said plurality of combustion chambers.

4. The apparatus of claim 3 each one of said plurality of main-fuel injection valves comprises a nozzle extending into said associated one of said combustion chambers such that said main fuel is injectable directly into each one of said associated combustion chambers.

5. The apparatus of claim 1 wherein said secondary-fuel injection valve and said main-fuel injection valve are independently operable and integrated in a combined dual fuel injection valve assembly with orifices for separately introducing said main fuel and said secondary fuel directly into said combustion chamber.

6. The apparatus of claim 1 further comprising an accumulator fluidly connected to a main-fuel supply pipe with a shut off valve between said accumulator and said main-fuel supply pipe.

7. The apparatus of claim 6 wherein said accumulator is in fluid communication with said main-fuel supply pipe at a point between a device for pressurizing said main fuel and a pressure regulating valve.

8. The apparatus of claim 7 further comprising a second accumulator vessel that is in fluid communication with said main-fuel supply pipe.

9. The apparatus of claim 1 wherein said main-fuel supply system comprises a device for pressurizing said main fuel and a main-fuel supply pipe for delivering said main fuel from said device to said main-fuel injection valve.

10. The apparatus of claim 9 wherein said device is a compressor.

11. The apparatus of claim 10 further comprising a thermally insulated storage tank adapted to store said main fuel as a liquefied gas at cryogenic temperatures, and wherein said device for pressurizing said main fuel is a pump capable of pumping said liquefied gas.

12. The apparatus of claim 1 wherein said main-fuel supply system is adapted to supply a gaseous fuel selected from the group consisting of natural gas, methane, propane, butane, hydrogen, and blends thereof.

13. The apparatus of claim 1 wherein said secondary-fuel supply system is adapted to supply a liquid fuel selected from the group consisting of diesel fuel, dimethylether, bio-diesel, and kerosene.

14. The apparatus of claim 1 wherein said secondary-fuel injection valve and said main-fuel injection valve are integrated into a single assembly.

15. A method of determining when to fuel an internal combustion engine with main fuel and secondary fuel or secondary fuel alone, said method comprising:
 (a) measuring available injection pressure of said main fuel;
 (b) operating in a dual fuel mode in which said engine is operable at power levels up to full power, by fuelling said engine with said main fuel and said secondary fuel with commanded quantity and injection timing for each fuel determined based upon engine speed and engine load, when said available injection pressure is above a predetermined threshold pressure; and
 (c) operating in a secondary fuel mode in which said engine is operable at reduced power levels less than full power for up to a predetermined amount of time, by fuelling said engine with secondary fuel alone with commanded quantity and injection timing based upon engine speed and load.

16. The method of claim 15 further comprising:
switching between said dual fuel mode and said secondary fuel mode when said available injection pressure equals said predetermined threshold pressure, and then enabling a deadband which defines a predetermined pressure range that comprises said threshold pressure;
preventing further switching between operating modes until said deadband is disabled;
disabling said deadband and operating in said dual fuel mode when said available injection pressure is higher than said predetermined pressure range; and
disabling said deadband and operating in said secondary fuel mode when said available injection pressure is lower than said predetermined pressure range.

17. The method of claim 16 wherein said predetermined pressure range has boundaries higher and lower than said threshold pressure.

18. The method of claim 15 wherein when said engine is operating in said secondary fuel mode, said method further comprising providing a warning to an engine operator that the engine will shut down if said predetermined amount of time expires, and shutting down said engine when said predetermined amount of time expires.

19. The method of claim 18 wherein said predetermined amount of time is 10 minutes.

20. The method of claim 18 wherein said predetermined amount of time is less than 15 minutes.

21. The method of claim 15 further comprising pressurizing an accumulator vessel for said main fuel before shutting down said engine.

22. The method of claim 21 further comprising closing a shut off valve between said accumulator vessel and a main fuel supply pipe before shutting down said engine.

23. The method of claim 22 further comprising opening said shut off valve for a predetermined time when said engine is starting up until available injection pressure equalizes with pressure inside said accumulator, and then closing said shut off valve until said available injection pressure is raised to a high set point.

24. The method of claim 15 further comprising pressurizing a large accumulator vessel and a small accumulator vessel, wherein both accumulator vessels are in fluid communication with a main-fuel supply pipe that delivers main fuel to said main-fuel injection valve.

* * * * *

UNITED STATES PATENT AND TRADEMARK OFFICE
CERTIFICATE OF CORRECTION

| | | |
|---|---|---|
| PATENT NO. | : 7,627,416 B2 | Page 1 of 1 |
| APPLICATION NO. | : 12/208020 | |
| DATED | : December 1, 2009 | |
| INVENTOR(S) | : Greg Batenburg et al. | |

It is certified that error appears in the above-identified patent and that said Letters Patent is hereby corrected as shown below:

Title Page, Item (73) Assignee: Change "Vancounver" to -- Vancouver --.

Signed and Sealed this

Sixteenth Day of February, 2010

David J. Kappos
*Director of the United States Patent and Trademark Office*